(No Model.)

J. A. DEVANTERY.
PROCESS OF MAKING GAME COUNTERS, &c.

No. 469,344. Patented Feb. 23, 1892.

WITNESSES:

INVENTOR
Joseph A. Devantery

BY ____ HIS ATTY.

UNITED STATES PATENT OFFICE.

JOSEPH A. DEVANTERY, OF BROOKLYN, ASSIGNOR TO HIRAM W. HARRIS, OF NEW YORK, N. Y.

PROCESS OF MAKING GAME-COUNTERS, &c.

SPECIFICATION forming part of Letters Patent No. 469,344, dated February 23, 1892.

Application filed March 19, 1891. Serial No. 385,574. (No model.)

*To all whom it may concern:*

Be it known that I, JOSEPH A. DEVANTERY, of Brooklyn, Kings county, and State of New York, have invented a certain new and useful Process of Making Game-Counters and Like Articles, of which the following is a specification.

My improvement relates to game-counters which have different portions made of different plastic materials. In the sense in which I speak of different materials I mean to include materials of the same kind differently colored. It has been common to make game-counters of this kind by using a body of one material, a marginal portion of another material, and a center of the material different from the body, or of combining a body portion and a marginal portion of different materials.

The object of my improvement is to secure a better union of different materials in counters of the kinds described.

My improvement involves the making of a marginal portion of one material, a body portion in two sections of another material, the two sections having their edges beveled or tapered outwardly, so that when the marginal portion is united with them it will overlap them and securely lock them in place. Where a third part, consisting of a central portion, is used, it will be made of a single mass and the inner edges of the body will be beveled or inclined, so that the center will lock upon them.

Figure 1:
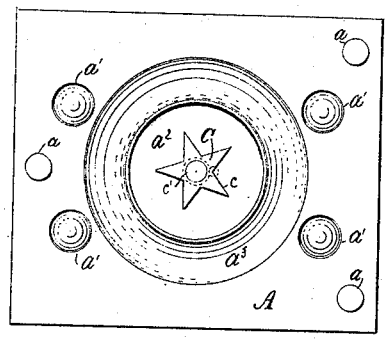
Figure 2:
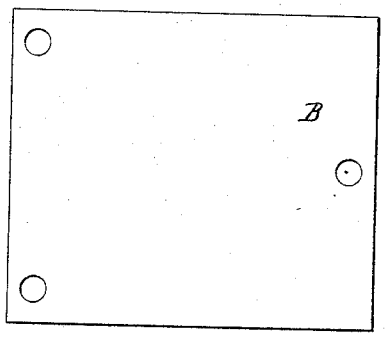
Figure 3:
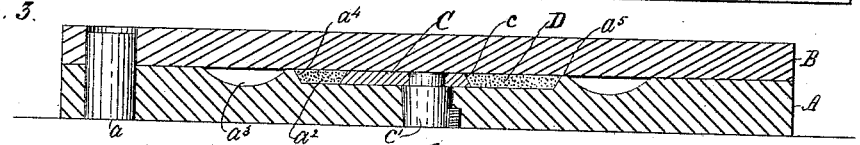
Figure 5:
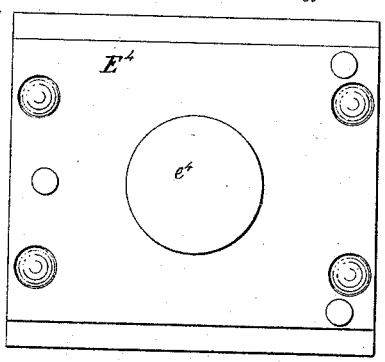
Figure 7:
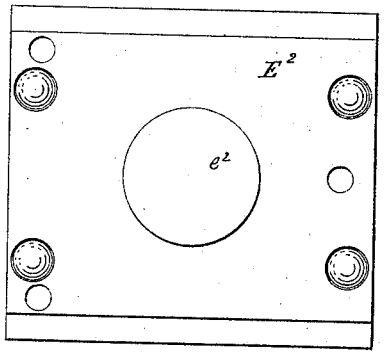
Figure 4:
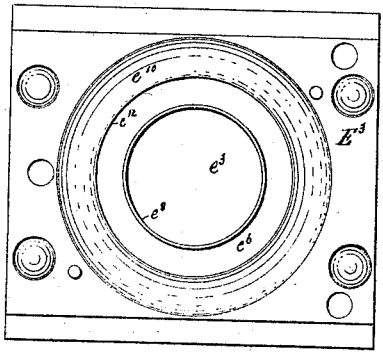
Figure 6:
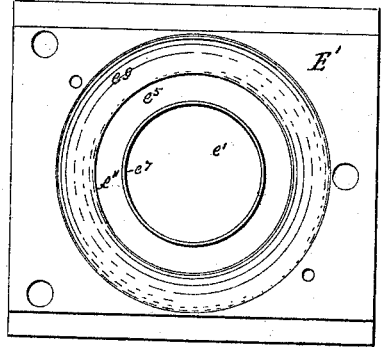
Figures 8, 9:
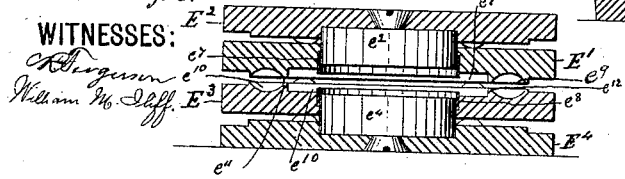

In the accompanying drawings, Figure 1 is a top view of the bottom plate of a mold embodying my improvement. Fig. 2 is a view of the under side of the top plate thereof. Fig. 3 is a horizontal section of the mold having its two parts fitted together. This last view is made on a larger scale. Fig. 4 is a top view of the main bottom plate of a compound mold used in carrying out my improvement. Fig. 5 is a top view of a secondary bottom plate of this compound mold. Fig. 6 is a bottom view of the main top plate of this compound mold. Fig. 7 is a bottom view of the secondary top plate of this mold. Fig. 8 is a central vertical section of the compound mold with all its parts together. Fig. 9 is a section of a finished counter, but the peculiarities of its structure are somewhat exaggerated in order to the better illustrate its construction.

Similar letters of reference designate corresponding parts in all the figures.

Referring first to Figs. 1 and 2, A designates the bottom plate, and B the top plate, of a mold. These two plates are centered or fitted together by means of pins $a$ on the bottom plate entering holes in the top plate. India-rubber springs $a'$ may be inserted in recesses in the bottom plate, so as to project slightly above the same to facilitate the removal of the top plate. The top plate B is plain on the under side. The bottom plate has, however, a molding-cavity $a^2$ and a waste-cavity $a^3$ surrounding the molding-cavity. The outer edge $a^4$ of the molding-cavity is beveled or inclined upwardly, so as to render the molding-cavity flaring. The molding-cavity almost meets the waste-cavity $a^3$, so that between the two cavities comparatively sharp cutting or defining edges $a^5$ are formed. In this example of my improvement there is in the molding-cavity a star-shaped figure C. This has its outer edges $c$ made to taper upward. It is provided with a shank $c'$, which fits into a hole formed in the plate A. It may be fastened there by means of a screw inserted partly in the shank and partly in the plate or by any other means. It is made detachable, so that another part of different shape may be substituted for it. Obviously a piece of plastic material treated in this mold will have formed in its center a star-shaped hole and will have a circular outer edge. I have shown such a piece of plastic material in Fig. 3 and marked it with the letter D. It will be seen from this figure that its outer edge flares upwardly and that its inner edge is reversely inclined in an upward direction.

The mold shown in Figs. 4 to 8, inclusive, has a main top plate E', which has a central hole $e'$, and a secondary top plate E², provided with a central hub or boss $e^2$, which may be arranged above the main top plate with its boss $e^2$ fitting in the central hole $e'$ of such main top plate. This mold also has a main bottom plate E³, provided with a central hole $e^3$, and a secondary bottom plate E⁴, provided with a hub or boss $e^4$. The main bottom plate will be placed above the secondary bottom plate with its hole $e^3$ surrounding the boss $e^4$ of the secondary bottom plate. The plates of this mold may be centered by pins in the usual manner, and, if desired, springs of india-rubber may be interposed between them. While my improvement is not restricted to the use of this compound mold, such mold is advantageous. I do not lay any claim to the mold itself as a part of my invention. It will be seen that the main top and bottom plates have central molding-cavities $e^5$ $e^6$, and inward of these cavities and around their central holes $e'$ $e^3$ metal rings $e^7$ $e^8$. These metal rings project, respectively, above and below the molding-cavities of their plates. A mass of material which is to form the marginal portion of a counter is placed between the plates of this compound mold and is intended to fill the molding-cavities of the main top and bottom plates outside of the metal rings $e^7$ $e^8$. If there is any surplus, it will be forced over into waste-cavities $e^9$ $e^{10}$, with which the plates are provided outside of cutting-edges $e^{11}$ $e^{12}$. The metal rings $e^7$ $e^8$ define the inner edge of the marginal portion. Two disks or sections D, such as are formed by the mold illustrated by Figs. 1, 2, and 3, will be placed one above the other between the mold-plates of the compound mold. They will be placed with their larger diameters back to back, so as to form a body-section whose edges taper from the center toward the upper and lower surfaces. When the pressing is done in the mold, the material forming the marginal portion will be pressed over the edges of the body portion, and in this way a firm union or locking of the marginal portion with the body portion will be secured. A mass of plastic material will be inserted in the central opening of the body portion, and, as this central opening, when the two parts or sections D are put together, as described, will have their edges flaring from the center toward both the top and bottom sides, this plastic material will during treatment in the mold be securely locked to the two sections of the body portion.

While I have described this improvement in connection with game-counters, I would remark that it might be applied to other articles of analogous character.

What I claim as my invention, and desire to secure by Letters Patent, is—

1. The process of making an article of plastic material having a marginal portion and a separately-made central portion or body, consisting in forming the central portion or body with edges inclined or offset in reverse directions from the center toward the opposite sides and pressing the marginal portion over such edges, substantially as specified.

2. The process of making an article of plastic material having a marginal portion and a separately-made central portion or body, consisting in forming the central portion or body of two independent sections having their edges inclined or offset outwardly, placing these sections with their largest sides in contact within a mold, and then pressing the plastic material forming the marginal portion of the article over the edges of the central or body portion, substantially as specified.

3. The process of making an article of plastic material having a marginal portion, a separately-made body, and a separately-made center within the body, consisting in forming the body with its inside and outside edges inclined or offset in reverse directions from the center toward the opposite sides and pressing the marginal and center portions over the edges of the body, substantially as specified.

In testimony whereof I have signed my name to this specification in the presence of two subscribing witnesses.

JOSEPH A. DEVANTERY.

Witnesses:
C. R. FERGUSON,
D. W. MAXON.